United States Patent
Hyun et al.

(10) Patent No.: US 7,532,858 B2
(45) Date of Patent: May 12, 2009

(54) METHOD FOR DETERMINING EXISTENCE OF REPEATER USING PORTABLE INTERNET SIGNAL AND METHOD FOR MEASURING POSITION OF MOBILE STATION USING THE SAME

(75) Inventors: Moon-Pil Hyun, Suwon-si (KR); Jong-Sun Pyo, Suwon-si (KR); Jin-Won Kim, Seoul (KR); Ji-Youn Jeon, Seoul (KR)

(73) Assignee: Samsung Electronics Co., Ltd (KR)

( * ) Notice: Subject to any disclaimer, the term of this patent is extended or adjusted under 35 U.S.C. 154(b) by 658 days.

(21) Appl. No.: 11/332,659

(22) Filed: Jan. 13, 2006

(65) Prior Publication Data

US 2006/0155826 A1    Jul. 13, 2006

(30) Foreign Application Priority Data

Jan. 13, 2005    (KR)    ...................... 10-2005-0003462

(51) Int. Cl.
    *H04Q 7/20*    (2006.01)
(52) U.S. Cl. ................ 455/11.1; 455/456.1; 455/456.6; 455/426.1; 455/466; 455/550.1; 709/203; 709/218; 709/219; 709/228; 370/310; 370/315
(58) Field of Classification Search ................ 455/11.1, 455/456.1–457, 426.1, 426.2, 466, 422.1, 455/403, 445, 500, 517, 552.1, 550.1, 553.1, 455/404, 404.1; 709/203, 218, 219, 228, 709/229; 370/315, 310
See application file for complete search history.

(56) References Cited

U.S. PATENT DOCUMENTS

2004/0147221 A1 *    7/2004    Sheynblat et al. .......... 455/12.1

FOREIGN PATENT DOCUMENTS

| WO | WO 02/17669 | 2/2002 |
| WO | WO 02/059638 | 8/2002 |
| WO | WO 02/082850 | 10/2002 |

\* cited by examiner

*Primary Examiner*—Keith T Ferguson
(74) *Attorney, Agent, or Firm*—The Farrell Law Firm, PC

(57) ABSTRACT

Disclosed is a method for determining an existence of a repeater using a portable Internet signal and for measuring a position of a mobile station using the same, the method receiving a portable Internet signal and a mobile communication signal from a base station, calculating distances between a mobile station and the base station according to the received portable Internet signal and the received mobile communication signal, and determining the existence of the repeater by comparing the calculated distances with each other. Receiving a mobile communication signal and the portable Internet signal, calculating distance values between the mobile station and a base station according to the received mobile communication signal and the received portable Internet signal, determining a distance value to be used for measurement of the position of the mobile station among the calculated distance values according to existence of errors in the portable Internet signal and the mobile communication signal, and measuring the position of the mobile station using the determined distance values.

11 Claims, 6 Drawing Sheets

METHOD FOR DETERMINING EXISTENCE OF REPEATER USING PORTABLE INTERNET SIGNAL AND METHOD FOR MEASURING POSITION OF MOBILE STATION USING THE SAME

PRIORITY

This application claims priority to an application entitled "Method For Determining Existence Of Repeater Using Portable Internet Signal And Method For Measuring Position Of Mobile Station Using The Same" filed in the Korean Intellectual Property Office on Jan. 13, 2005 and assigned Ser. No. 2005-3462, the contents of which are incorporated herein by reference.

BACKGROUND OF THE INVENTION

1. Field of the Invention

The present invention relates to a method for determining the existence and position of a repeater, and more particularly to a method for determining the existence of a repeater in a mobile communication system using a portable Internet signal and a method for measuring a position of a mobile station using the repeater.

2. Description of the Related Art

Recently, a position measurement technique using a pilot signal of a mobile communication system has been employed in various realms. A mobile communication system measures a predetermined position of a mobile station mainly using a triangulation procedure known as a Time Difference of Arrival (TDOA) scheme which calculated the TDOA of a base station pilot signal.

FIG. 1 is a view for explaining a method for measuring the position of a mobile station using the conventional TDOA scheme wherein the position of the mobile station is measured based on TDOA of signals transmitted to a mobile station from different base stations such as a first base station, a second base station, and a third base station. In other words, propagation TDOA is calculated, which is proportional to a difference between a distance from the first base station to the mobile station and a distance from the third base station to the mobile station based on the second base station, and the mobile station is positioned at a point holding a constant difference between the distance from the first base station to the mobile station and the distance from the third base station to the mobile station. In other words, as shown in FIG. 1, two hyperbolas are obtained from three base stations, and an intersection point of the two hyperbolas becomes the position of the mobile station. In this case, the TDOA is usually measured through a cross correlation scheme.

However, the mobile communication system employs a repeater for amplifying a pilot signal of a base station in order to deliver a signal having stronger intensity to a mobile station because signals of the base station are attenuated according to distances. In particular, the mobile communication system allows the signals of the base station to be delivered through the repeater to locations which cannot receive the signals of the base station, such as downtown buildings or undergrounds (e.g., subways and underground structures, etc.). However, if a repeater is installed, the pilot signal of the base station is delivered to the mobile station through the repeater. Therefore, the pilot signal is delayed by the time to correspond to the distance passing through the repeater (e.g., several kilometers to several tens of kilometers) when the pilot signal of the base station is passed through the repeater rather than the pilot signal of the base station is not passed through the repeater In addition, the delay of the pilot signal of the base station due to the repeater induces an error in the measurement of a distance between the base station and the mobile station. Accordingly, when the position of the mobile station is measured through the TDOA scheme, the delay due to the repeater must be considered by determining if the received pilot signal of the base station is delivered through the repeater.

Conventionally, a chip delay of the received base station pilot signal is determined, and, if the chip delay has a large value, it is determined that the received base station pilot signal was transmitted from a repeater. However, through this chip delay determining method, it is difficult to accurately determine if the received base station pilot signal was transmitted from repeater and whether a reference base station signal if the reference base station signal was transmitted from the repeater. In addition, when it is difficult to determine the existence of the repeater, it is impossible to measure the position of a mobile station using the base station pilot signal.

Accordingly, it is necessary to develop a technique for determining the existence and location of a repeater.

Recently, a portable Internet system has been developed in such a manner that the portable Internet system has a superior signal receiving rate even in environments such as an urban downtown, an RF shadow area, and an indoor area, does not require a repeater, and can interwork with the mobile communication system. Accordingly, it is possible to more exactly determine the existence of a repeater and measure the position of a mobile station using the portable Internet system.

SUMMARY OF THE INVENTION

Accordingly, the present invention has been made to solve the above-mentioned problems occurring in the prior art, and an object of the present invention is to provide a method for determining the existence of a repeater in a mobile communication system using a portable Internet signal.

An other object of the present invention is to provide a method for measuring a position of a mobile station by determining distance values to be used for measuring the position of the mobile station among distance values between base stations and the mobile station according to determination for establishing an existence of a repeater and by using the determined distance values.

To accomplish the above objects, there is provided a method for determining an existence of a repeater of a base station using a portable Internet signal, the method including the steps of receiving a portable Internet signal and a mobile communication signal from the base station, calculating distances between a mobile station and the base station according to the received portable Internet signal and the received mobile communication signal, and determining the existence of the repeater of the base station by comparing the calculated distances.

According to another aspect of the present invention, there is provided a method for measuring a position of a mobile station using a portable Internet signal, the method including the steps of receiving a mobile communication signal and the portable Internet signal, calculating distance values between the mobile station and a base station according to the received mobile communication signal and the received portable Internet signal, determining a distance value to be used for measurement of the position of the mobile station among the calculated distance values according to an existence of errors in the portable Internet signal and the mobile communication signal, and measuring the position of the mobile station using the determined distance values.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Figure 1:
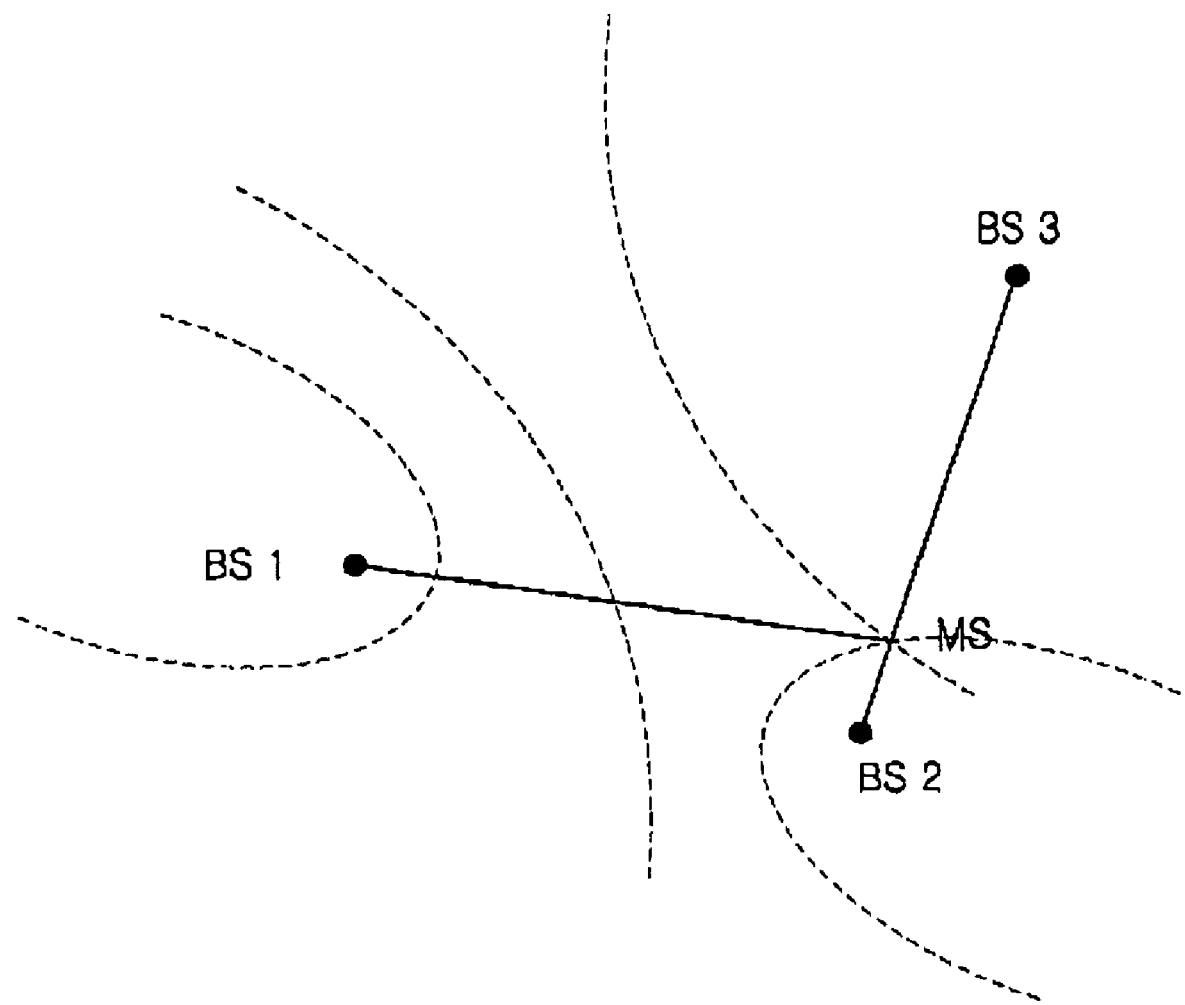
FIG. 1 is a diagram illustrating a method for measuring a position of a mobile station using the conventional TDOA scheme.

Hereinafter, a preferred embodiment of the present invention will be described in detail with reference to the accompanying drawings. Note that the same or similar components in drawings are designated by the same reference numerals as far as possible although they are shown in different drawings. In the following description of the present invention, a detailed description of known functions and configurations incorporated herein will be omitted when it may make the subject matter of the present invention unclear.

Figure 2:
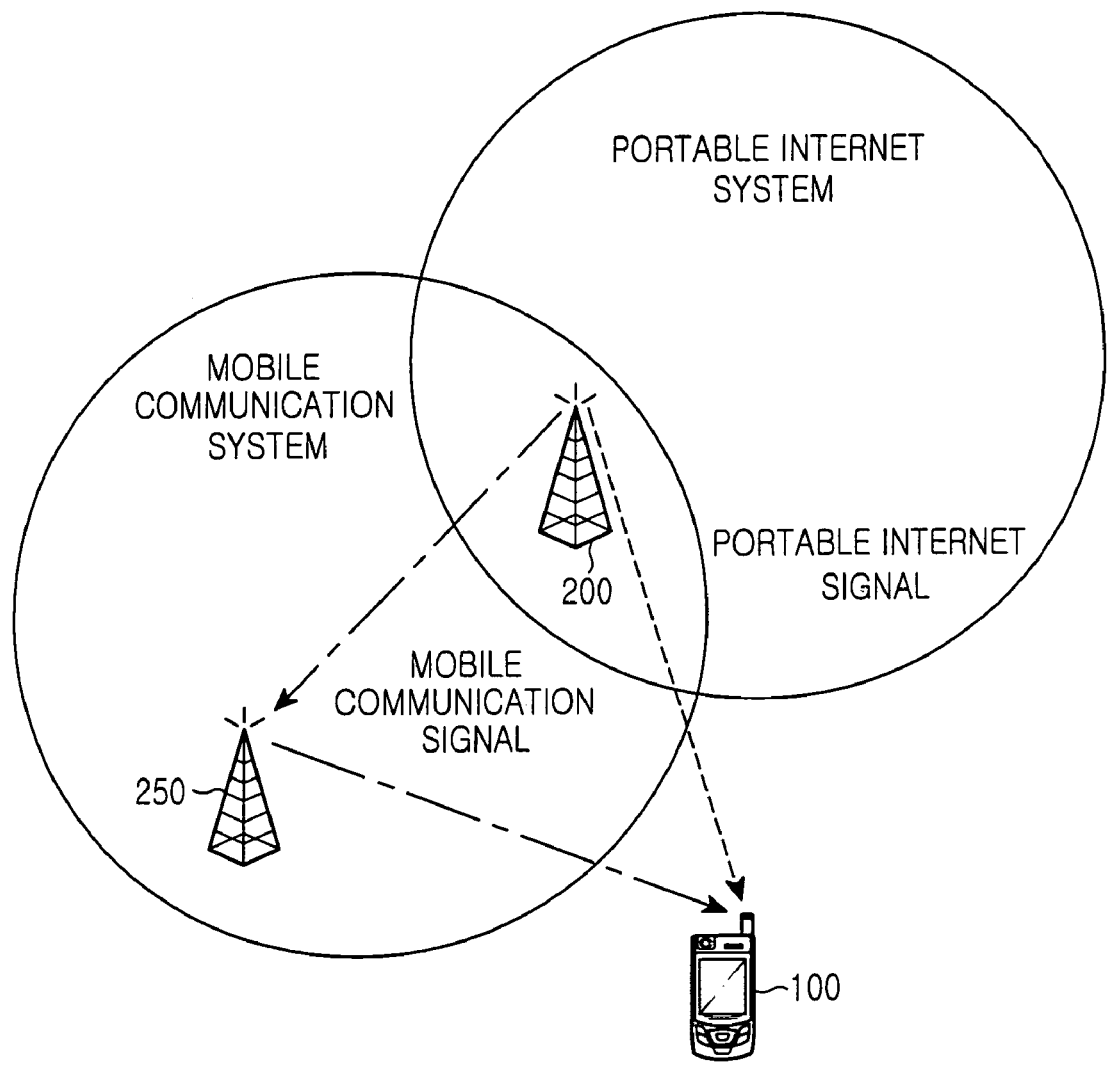
FIG. 2 is a diagram illustrating a method for determining the existence of a repeater according to an embodiment of the present invention.

FIG. 2 is a diagram illustrating a method for determining the existence of a repeater according to an embodiment of the present invention. A portable Internet system according to an embodiment of the present invention provides a mobile communication service as well as a portable Internet service through a base station 200 by interworking with a mobile communication system.

Accordingly, a portable Internet signal such as an orthogonal frequency division multiple access (OFDMA) signal and a mobile communication signal such as a pilot signal of a code division multiple access (CDMA) system are transmitted to a mobile station 100 from base station 200 at the same time. The mobile station 100 receives a portable Internet signal and a mobile communication signal from base station 200.

However, in an actual mobile communication system, a repeater is installed in a location such as a downtown area, an underground area, etc., where signal intensity from the base station is low. Then, the mobile communication system amplifies and transmits a mobile communication signal through the repeater. In contrast, a portable Internet system does not employ the repeater.

Accordingly, although a portable Internet signal and a mobile communication signal are transmitted to the mobile station 100 from the same base station at the same time, the two signals have a different time of arrival (even though they arrive at the same time) at the mobile station 100 because the mobile communication signal is delayed while passing through the repeater.

Therefore, according to an embodiment of the present invention, (TOA) a repeaters existence in the mobile communication system is determined by using time difference of arrival (TDOA) between the portable signal and the mobile communication signal in the mobile station 100.

Figure 3:
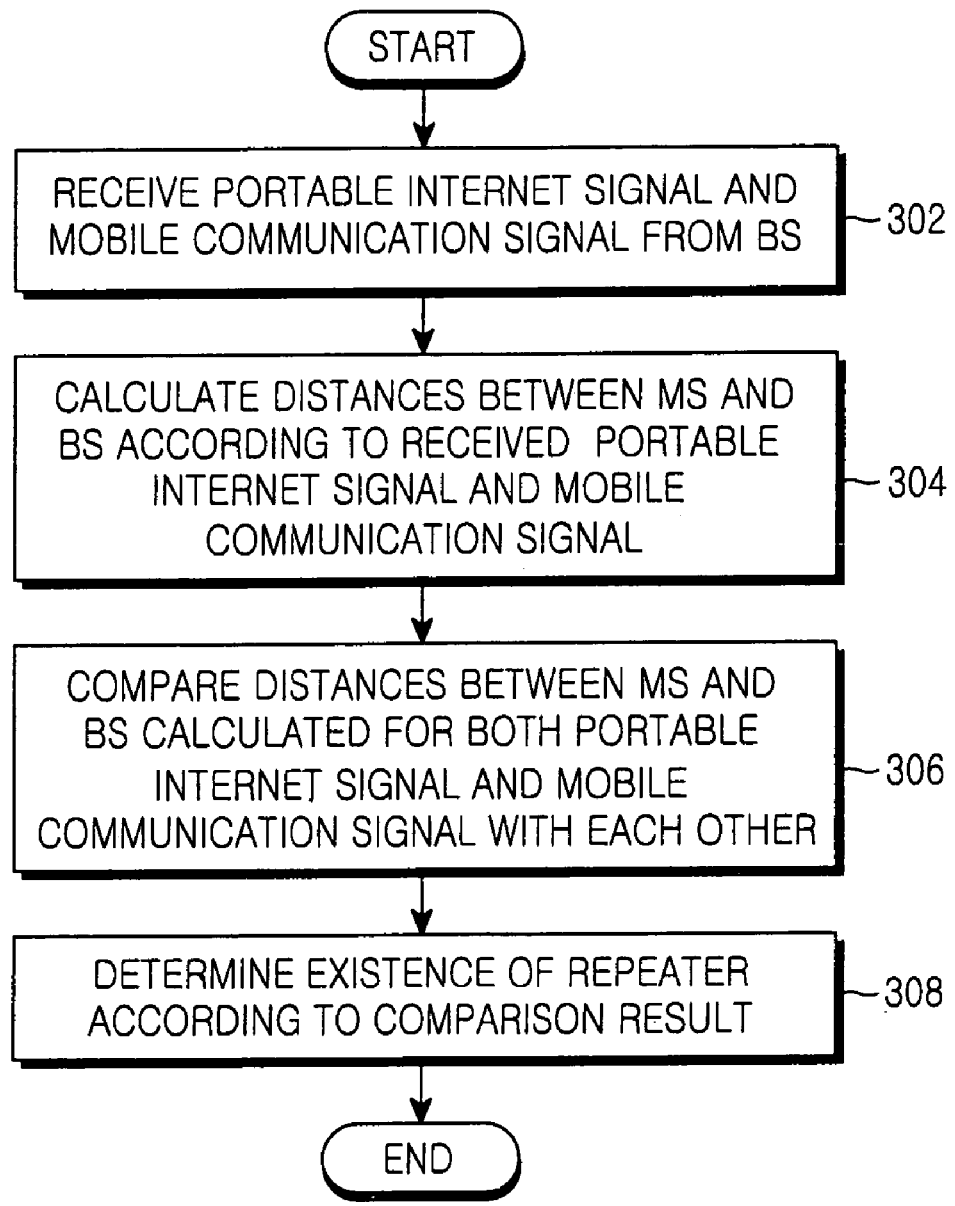
FIG. 3 is a flowchart illustrating a procedure for determining the existence of a repeater according to an embodiment of the present invention.

FIG. 3 is a flowchart illustrating a procedure of determining the existence of a repeater according to an embodiment of the present invention. The mobile station 100 receives a portable Internet signal and a mobile communication signal from the base station 200 in step 302. For example, the mobile station 100 receives a downlink signal of a portable Internet system and a pilot signal of a mobile communication system from the base station 200.

In step 304, the mobile station 100 calculates distances between the mobile station 100 and the base station 200 according to the received two signals. For example, the mobile station 100 calculates a distance between the mobile station 100 and the base station 200 according to the portable Internet signal using the number of samples and the number of symbols in the downlink signal received from the portable Internet system. In addition, the mobile station 100 calculates a distance between the mobile station 100 and the base station 200 according to the mobile communication signal using a number of pseudo random noise phases of the pilot signal received from the mobile communication system.

In addition, the mobile station 100 compares distances between the mobile station 100 and the base station 200 calculated with respect to the two signals with each other in step 306. In step 308, the mobile station 100 determines if the repeater of the mobile communication system exists according to the comparison result. In other words, if a difference between the distance from the mobile station 100 to the base station 200 calculated according to the mobile communication signal and the distance from the mobile station 100 to the base station 200 calculated according to the portable Internet signal is larger than a predetermined threshold value, the mobile station 100 determines that the repeater exists in the mobile communication system. In addition, if the difference between the distance from the mobile station 100 to the base station 200 calculated according to the mobile communication signal and the distance from the mobile station 100 to the base station 200 calculated according to the portable Internet signal is smaller than the predetermined threshold value, the mobile station 100 determines that the repeater does not exist in the mobile communication system. Herein, the predetermined threshold value may be a distance measurement error value to the repeater.

In the meantime, the position of a mobile station is measured using the TDOA scheme described with reference to FIG. 1. In order to measure the position of the mobile station using this TDOA scheme, distances between at least four base stations and the mobile station are required. According to an embodiment of the present invention, distances from at least four base stations using a portable Internet signal or a mobile communication signal received from base stations belonging to the portable Internet system or the mobile communication system are calculated, and then the position of the mobile station is measured using the distances.

Figure 4:
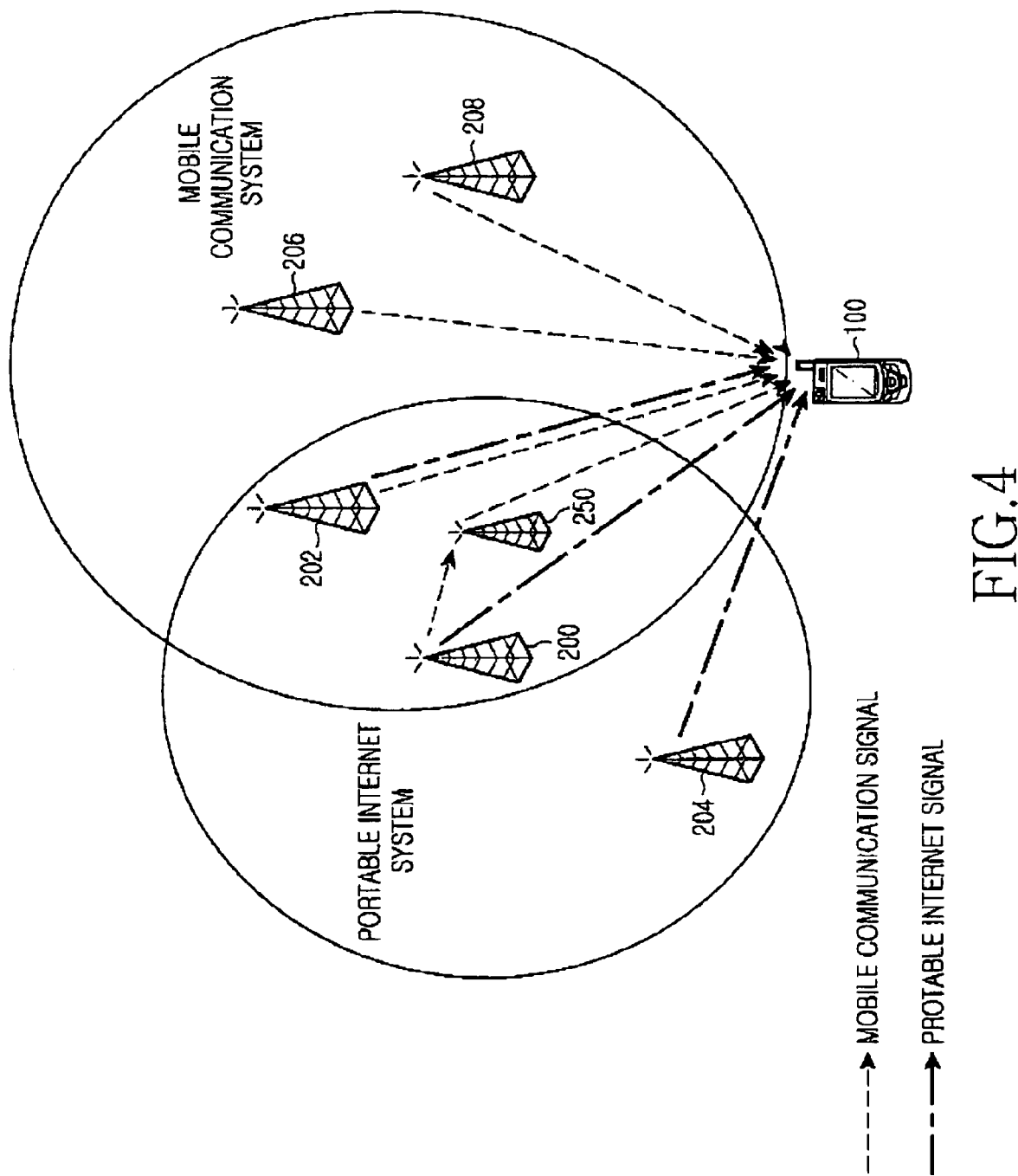
FIG. 4 is a diagram illustrating a method for measuring the position of a mobile station according to an embodiment of the present invention.

FIG. 4 is a diagram illustrating a method for measuring the position of a mobile station 100 according to an embodiment of the present invention. The distance between the mobile station 100 and a base station calculated using the portable Internet signal does not have an error due to a repeater because base stations in the portable Internet system do not use repeaters, so that the distance between the mobile station and the base station calculated using the portable Internet signal may be used for more accurately the determining a position of the mobile station 100.

However, due to the existence of the base station 200 using a repeater 250 among base stations (200, 204, 206 and 208) in the mobile communication system, a distance value between a base station and a mobile station calculated using the mobile communication signal may have an error due to the repeater 250. Accordingly, it is determined if the error due to the repeater 250 is included in the distance value between the mobile station and the base station 200 calculated using the mobile communication signal, and then the distance value between the mobile station 100 and the base station 200 calculated using the mobile communication signal must be used in order to measure the position of the mobile station.

Therefore, according to an embodiment of the present invention, the method for determining the existence of a repeater 250 in the mobile communication system is used, thereby determining distance values which can be used in order to measure the position of the mobile station 100 among distance values between the mobile station and the base station 200 calculated using the portable Internet signal or the mobile communication signal. Then, the position of the mobile station 100 is measured by using distance values according to the portable Internet signal among distance values which may be used for the measurement of the mobile station's 100 position.

Figure 5:
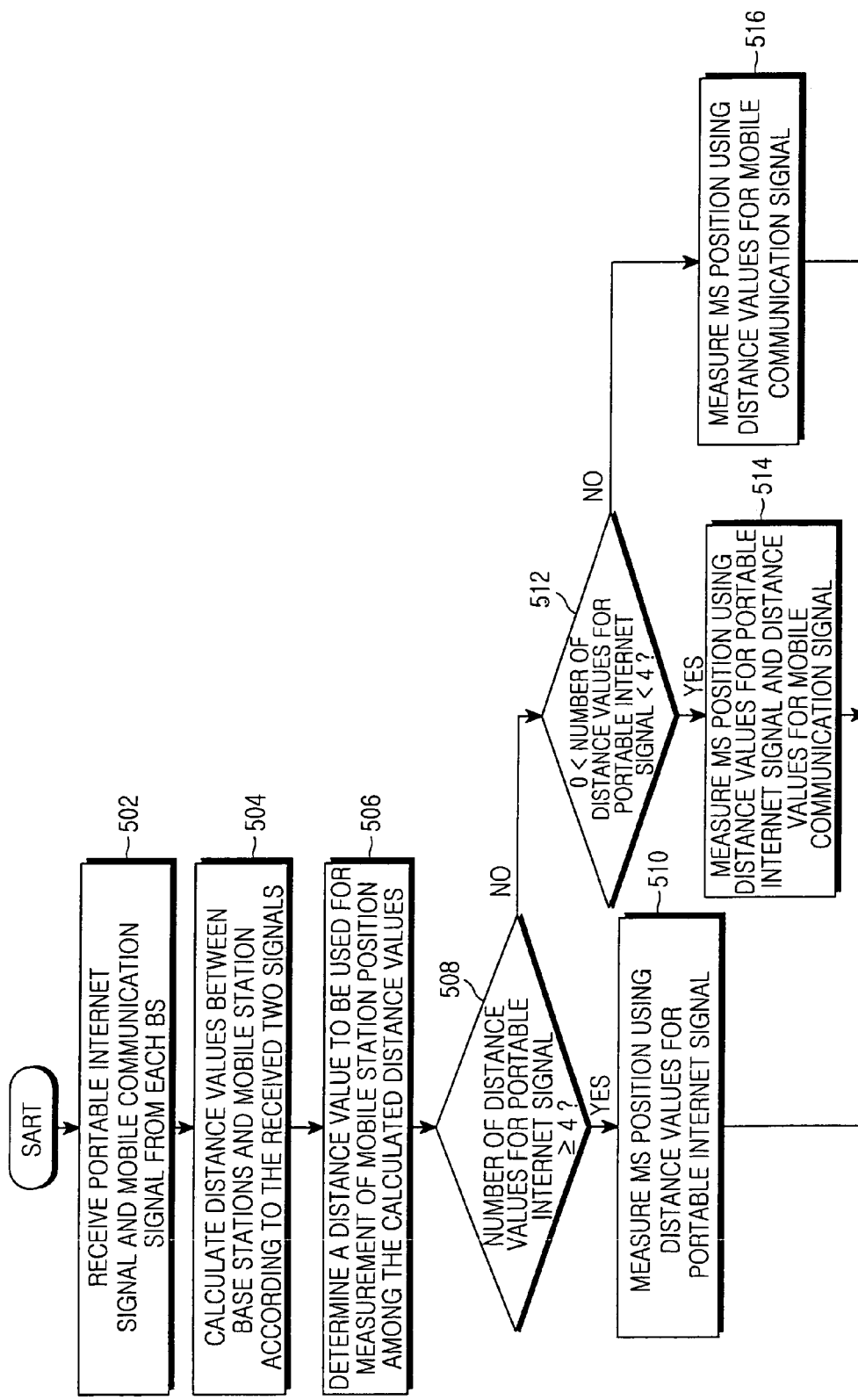
FIG. 5 is a flowchart illustrating a procedure for measuring the position of the mobile station according to an embodiment of the present invention.

Hereinafter, the method for measuring the mobile station's 100 position according to an embodiment of the present invention will be described in detail. FIG. 5 is a flowchart illustrating a procedure for measuring the mobile station's 100 position according to an embodiment of the present invention. Referring to FIGS. 4 and 5, the mobile station 100 receives either or both of portable Internet signals and mobile communication signals from base stations 200, 202, 204, 206 and 208 in the portable Internet system and the mobile communication system shown in FIG. 4. For example, in step 502, the mobile station 100 receives both a portable Internet signal and a mobile communication signal from the base stations 200 and 202, a portable Internet signal from the base station 204, and mobile communication signals from base stations 206 and 208 in FIG. 4

Thereafter, the mobile station 100 having received either or both of the portable Internet signals and mobile communication signals from the base stations 200 to 208 calculates distances between the base stations and the mobile station according to the two types of signals received in step 504. For example, although this is not shown, if base stations 200 and 202 transmit both the portable Internet signal and the mobile communication signal, the mobile station 100 calculates distances between the mobile station and each of the base stations 200 and 202 by using the above two signals, that is, the portable Internet signal and the mobile communication signal. In addition, if the base station 204 only transmits the portable Internet signal, the mobile station 100 calculates a distance between the mobile station and the base station 204 using the portable Internet signal. If base stations 206 and 208 transmit only mobile communication signals, the mobile station 100 may calculate distances between the mobile station and the base stations 206 and 208 by using the mobile communication signals.

However, in the calculation result, since two types of distance values between the mobile station 100 and the base stations transmitting both the portable Internet signal and the mobile communication signal (e.g. 200 and 202) are calculated, a distance value to be used for the measurement of the mobile station's 100 position must be determined among the two types of distance values.

Accordingly, the mobile station 100 determines a distance value to be used for the measurement of the mobile station's 100 position among the calculated distance values in step 506.

Figure 6:
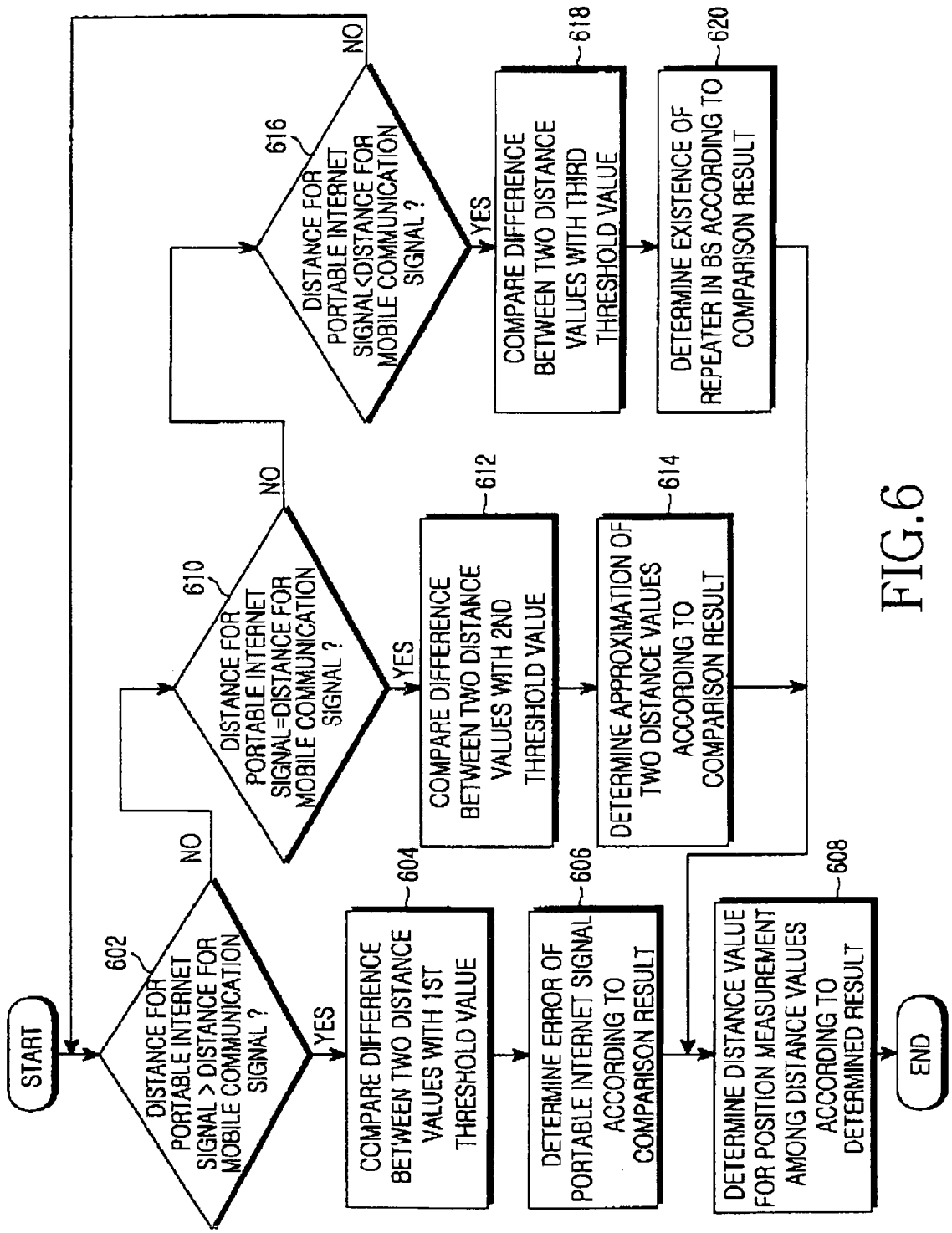
FIG. 6 is a flowchart illustrating a procedure for determining a distance value to be used for measurement of the position of a mobile station according to an embodiment of the present invention.

FIG. 6 is a flowchart illustrating a procedure for determining a distance value to be used for the measurement of the mobile station position according to an embodiment of the present invention. The mobile station 100 determines if a distance according to a portable Internet signal is greater than a distance according to a mobile communication signal in step 602. In other words, when the mobile station 100 receives both the portable Internet signal and the mobile communication signal from the same base station, the mobile station 100 determines if a distance value between the mobile station and the base station calculated using the portable Internet signal is greater than a distance value between a mobile station and a base station calculated using the mobile communication signal.

If the distance according to the portable Internet signal is greater than the distance according to the mobile communication signal, the mobile station 100 compares the difference between the two distances with a first threshold value in step 604. In this case, the first threshold value is a reference value used for determining if the portable Internet signal has an error. The mobile station 100 compares the first threshold value with the difference between two distance values and then determines if the portable Internet signal has an error according to the comparison result in step 606. If the difference between two distance values is greater than the first threshold value, it is determined that the portable signal has an error. If the difference between two distance values is not greater than the first threshold value, the mobile station 100 determines that the portable signal does not have an error. The mobile station 100 determines a distance value for a position measurement among distance values according to the determined result in step 608.

However, if the distance according to the portable Internet signal is not greater than the distance according to the mobile communication signal, the mobile station 100 determines if the distance according to the portable Internet signal equals to the distance according to the mobile communication signal in step 610. Here, the distance according to the portable Internet signal can be approximated to the distance according to the mobile communication signal.

In step 610, if it is determined that the distance according to the portable Internet signal approximates to the distance according to the mobile communication signal, the mobile station 100 compares a difference between two distances with a second threshold value in step 612. In this case, the second threshold value represents a reference value used for determining if the distance according to the portable Internet approximates to the distance according to the mobile communication signal. As described above, the mobile station 100 compares the difference between two distance values with the second threshold value and then determines that the distance according to the portable Internet signal approximates to the distance according to the mobile communication signal based on the comparison result in step 614. Herein, if the difference value between two distance values is greater than the second threshold value, the mobile station 100 determines that the distance according to the portable Internet signal does not approximate to the distance according to the mobile communication signal. If the difference value between two distance values is greater than the second threshold value, the mobile station 100 determines that the distance according to the portable Internet signal approximates to the distance according to the Internet signal.

In addition, if the distance according to the portable Internet signal is not greater than the distance according to the mobile communication signal, and if the distance according to the portable Internet signal does not approximate to the distance according to the mobile communication signal, the mobile station 100 determines if the distance according to the portable Internet signal is less than the distance according to the mobile communication signal in step 616.

In step 616, if the distance according to the portable Internet signal is less than the distance according to the mobile communication signal, the mobile station 100 compares the difference between two distance values with a third threshold value in step 618. Herein, the third threshold value represents a reference value used for determining if the mobile communication signal is received through a repeater. As describe above, the mobile station 100 compares the difference between two distance values with the third threshold value and then determines if there exist a repeater of a base station according to the comparison result in step 620. In this case, the mobile station 100 determines that the mobile communication signal is received through the repeater if the difference between two distance values is greater than the third threshold value.

Referring back to FIG. 5, the mobile station 100 then determines a distance value to be used for the measurement of a mobile station position among the distance values according to the determination result in step 510. For example, if the portable Internet signal includes an error according to the determination result, the mobile station 100 determines a distance value according to the mobile communication signal as a distance value to be used for the measurement of a mobile station's 100 position. In addition, if the distance value according to the portable Internet signal approximates to the distance value according to the mobile communication signal based on the determination result, the mobile station 100 selects one of the two distance values so as to determine the selected distance value as a distance value to be used for the measurement of the mobile station's 100 position. In addition, if the mobile communication signal is received through the repeater according to the determination result, the mobile station 100 determines the distance value according to the portable Internet signal as a distance value to be used for the measurement of a mobile station's 100 position.

Then, as described above, the mobile station 100 determines and thereafter examines distance values to be used for the measurement of a mobile station position so as to measure the position of the mobile station based on distance values according to a portable Internet signal. Here, the mobile station 100 examines whether the distance values are calculated using the portable internet signal or using the mobile communication signal.

For example, referring to FIG. 5, the mobile station 100 determines if there exist at least four distance values according to the portable Internet signal among distance values to be used in order to measure the mobile station position in step 508. If there exist at least four distance values according to the portable Internet signal, the mobile station 100 measures the mobile station position using the distance values according to the portable Internet signal in step 510.

However, if there are less than four distance values according to the portable Internet signal, the mobile station 100 determines if there exist at least one distance value according to the portable Internet signal in step 512. In step 512, if there are at least one three distance values according to the portable Internet signal, the mobile station 100 measures the mobile station's 100 position using distance values according to the portable Internet signal and distance values according to the mobile communication signal in step 514.

However, in step 512, if no distance values according to the portable Internet signal exist, the mobile station 100 measures a mobile station position using the distance values according to the mobile communication signal in step 516. The mobile station 100 measures the mobile station position mainly using distance values according to the portable Internet signal among distance values to be used for position measurement as described above because the portable Internet signal has a signal receiving rate higher than that of the mobile communication signal and has errors less than that of the mobile communication signal.

As described above, according to the present invention, distances between a base station and a mobile station according to a portable Internet signal and a mobile communication signal, respectively, are calculated and compared with each other, thereby enabling exact determination for the existence of a repeater in a mobile communication system.

In addition, according to the present invention, the position of the mobile station is measured by using distance values having little or no error due to the repeater among distance values between base stations and the mobile station based on the determination of the existence of the repeater, thereby enabling the more exact measurement for the position of the mobile station.

While the invention has been shown and described with reference to certain preferred embodiments thereof, it will be understood by those skilled in the art that various changes in form and details may be made therein without departing from the spirit and scope of the invention. Consequently, the scope of the invention should not be limited to the embodiments, but should be defined by the appended claims and equivalents thereof.

What is claimed is:

1. A method for determining an existence of a base station's repeater using a portable Internet signal, the method comprising the steps of:

receiving a portable Internet signal and a mobile communication signal from the base station;

calculating distances between a mobile station and the base station according to the received portable Internet signal and the received mobile communication signal; and determining the existence of the repeater of the base station by comparing the calculated distances with each other.

2. The method as claimed in claim 1, wherein the portable Internet signal is a downlink signal received from a portable Internet system.

3. The method as claimed in claim 1, wherein the mobile communication signal is a pilot signal received from a mobile communication system.

4. The method as claimed in claim 1, wherein the step of determining the existence of the repeater of the base station includes:

comparing a predetermined threshold value with a difference between a distance from the base station to the mobile station according to the mobile communication signal and a distance from the base station to the mobile station according to the portable Internet signal; and determining that the repeater exists in the base station if the difference is greater than the predetermined threshold value and determining that the repeater does not exist in the base station if the difference is less than the predetermined threshold value according to the comparison result.

5. The method as claimed in claim 4, wherein the predetermined threshold value is a distance measurement error due to the repeater.

6. A method for measuring a position of a mobile station using a portable Internet signal, the method comprising the steps of:
receiving a mobile communication signal and the portable Internet signal;
calculating distance values between the mobile station and a base station according to the received mobile communication signal and the received portable Internet signal;
determining a distance value to be used for measurement of the position of the mobile station among the calculated distance values according to existence of errors in the portable Internet signal and the mobile communication signal; and
measuring the position of the mobile station using the determined distance value.

7. The method as claimed in claim 6, wherein the step of determining the distance value to be used for measurement of the position of the mobile station includes:
comparing a distance value according to the portable Internet signal with a distance value according to the mobile communication signal; and
determining that an error exists in the portable Internet signal if the distance value according to the portable Internet signal is greater than the distance value according to the mobile communication signal and determining the mobile communication signal as a distance value to be used for the position measurement.

8. The method as claimed in claim 7, further comprising the steps of:
determining that the portable Internet signal and the mobile communication signal have no errors if the distance value according to the portable Internet signal is substantially equal to the distance value according to the mobile communication signal; and
determining one of the portable Internet signal and the mobile communication signal as a distance value to be used for the position measurement.

9. The method as claimed in claim 8, further comprising the steps of:
determining that the base station has a repeater if the distance value according to the portable Internet signal is LESS than the distance value according to the mobile communication signal; and
determining the portable Internet signal as the distance value to be used for the position measurement.

10. The method as claimed in claim 6, wherein the portable Internet signal is a downlink signal received from a portable Internet system.

11. The method as claimed in claim 6, wherein the mobile communication signal is a pilot signal received from a mobile communication system.

* * * * *